United States Patent [19]

Healey

[11] Patent Number: 5,185,814
[45] Date of Patent: Feb. 9, 1993

[54] OPTICAL FIBER COMMUNICATIONS NETWORK INCLUDING PLURAL AMPLIFIERS WITH SINGLE PUMP SOURCE

[75] Inventor: Peter Healey, Suffolk, England

[73] Assignee: British Telecommunications public limited company, London, England

[21] Appl. No.: 834,285

[22] PCT Filed: Jul. 13, 1990

[86] PCT No.: PCT/GB90/01076
§ 371 Date: Feb. 20, 1992
§ 102(e) Date: Feb. 20, 1992

[87] PCT Pub. No.: WO91/01066
PCT Pub. Date: Jan. 24, 1991

[30] Foreign Application Priority Data

Jul. 13, 1989 [GB] United Kingdom ............ 8916021
Oct. 6, 1989 [GB] United Kingdom ............ 8922527

[51] Int. Cl.⁵ ............ G02B 6/28; H01S 3/30; G02F 1/00
[52] U.S. Cl. ............ 385/24; 385/27; 385/48; 385/141; 372/6; 372/70; 359/127; 359/160; 359/333; 359/341
[58] Field of Search ............ 385/24, 27, 28, 30, 385/38, 31, 42, 44, 48, 88, 89, 122, 141; 359/127, 134, 160, 179, 180, 188, 333, 334, 341, 343, 345; 372/6, 69, 70, 97, 71

[56] References Cited

U.S. PATENT DOCUMENTS

| | | | |
|---|---|---|---|
| 3,571,737 | 3/1971 | Miller | 385/24 X |
| 4,740,974 | 4/1988 | Byron | 372/3 |
| 4,778,238 | 10/1988 | Hicks | 385/27 |
| 4,790,619 | 12/1988 | Lines et al. | 385/24 X |
| 4,852,117 | 7/1989 | Po | 372/6 |
| 5,050,949 | 9/1991 | Di Giovanni et al. | 385/24 X |
| 5,058,974 | 10/1991 | Mollenauer | 372/6 X |
| 5,058,976 | 10/1991 | Di Giovanni et al. | 385/15 X |
| 5,080,505 | 1/1992 | Epworth | 385/24 |
| 5,115,338 | 5/1992 | Di Giovanni et al. | 372/6 X |
| 5,131,069 | 7/1992 | Hall et al. | 372/6 X |

FOREIGN PATENT DOCUMENTS

| | | | |
|---|---|---|---|
| 0103382 | 3/1984 | European Pat. Off. | 385/24 X |
| 0248517 | 12/1987 | European Pat. Off. | 385/24 X |
| 61-17510 | 10/1986 | Japan | 385/123 X |
| 2175766 | 12/1986 | United Kingdom | 385/24 X |

OTHER PUBLICATIONS

Millar, "Fibre Lasers and Amplifiers for Telecommunicaions" Optic Soc. of Amer. Oct. 1987, pp. 189-192.
Edagawa et al., "904 km, 1.2 Gbit/s Non-regenerative Optical . . . " Pro. of 15th Eur. Conf. of Optic Comm. Sep. 1989, vol. 3, pp. 33-36.

Primary Examiner—Brian Healy
Attorney, Agent, or Firm—Nixon & Vanderhye

[57] ABSTRACT

An optical communications network in which optical signals from a transmitter (T) are distributed to receivers ($R_i$) via an optical waveguide (2) and couplers ($C_i$) are amplified as they propagate along the waveguide (2). The amplifiers $A_i$ are all pumped by a single optical pump source (4) coupled to the optical fibre (2) by a dichroic coupler (6). By using the optical waveguide (2) to distribute the pump power to the amplifiers $A_i$ multiple optical pump sources are avoided.

12 Claims, 7 Drawing Sheets

OPTICAL FIBER COMMUNICATIONS NETWORK INCLUDING PLURAL AMPLIFIERS WITH SINGLE PUMP SOURCE

BACKGROUND OF THE INVENTION

This invention relates to optical communication networks and particularly, but not exclusively, optical fibre communications networks for distributing optical signals from transmitting stations to one or more receiving stations.

In this specification the term "optical" is intended to refer to that part of the electromagnetic spectrum which is generally known as the visible region together with those parts of the infra-red and ultraviolet regions at each end of the visible region which are capable of being transmitted by dielectric optical waveguides such as optical fibres.

One approach to transferring data from a transmitting station to many receiving stations is to transmit the data for the respective receiving stations in a dedicated time slot on a common optical carrier of a particular wavelength. The optical signal is then passively distributed via an optical waveguide network to each of the receiving stations which extracts data from the appropriate time slot. An alternative approach is to transmit the data for each receiving station on a distinct wavelength. The wavelength multiplex so formed is again passively split to each receiving station which demultiplexes the appropriate wavelength to receive the data intended for it.

In each of these approaches, and others which rely on passive splitting of an optical signal to two or more receiving stations, it is sometimes necessary to amplify the optical signal to compensate for losses such as absorption and insertion losses and the signal power diverted to a receiver to ensure that there is sufficient optical power for receivers further downstream. This has been achieved by amplifying the optical signal by means of optical amplifiers at one or more positions along the network for example using a power amplifier at the transmitter, repeater amplifiers, or preamplifiers at the receivers.

Known amplifiers employing optically pumped optical amplifiers employ dedicated optical pump sources colocated with the optical amplifier. See for example EP 248,517 A2 in which one or more portions of Raman-active optical fibre adapted for amplification of electro-magnetic radiation by means of stimulated Raman scattering, each portion having associated with it a local optical pump. For a large network this can result in a large number of widely distributed electro-optical units or laser sources which are relatively expensive compared to the rest of the optical network. Further, the failure rate of all or part of the network will increase with the number of such repeaters.

SUMMARY OF THE INVENTION

According to a first aspect of the present invention an optical communications network comprises an optical waveguide for distributing optical signals; an optical tapping means; and a pair of optically pumpable optical amplifying means, the optical tapping means being located between the pair of amplifying means, characterised in that the pair of amplifying means are optically pumped by one optical pump means, only, coupled to a single point of the waveguide.

According to a second aspect of the present invention an optical communications network comprises an optical waveguide for distributing optical signals; a plurality of optical tapping means; and a plurality of optically pumpable optical amplifying means located between at least some of the optical tapping means characterised in that all the optical amplifying means are optically pumped by one optical pump means, only, coupled to a single point of the waveguide.

The present invention in its two aspects obviates the need for an optical pump source at every optical amplifier of the network by using the optical waveguide that is used for distributing the optical signals to distribute the optical pump power from the optical pump to the two or more optical amplifier means.

Preferably the network has optical amplifying means which comprises at least portions of the optical waveguide doped with material to form an optical waveguide amplifier, for example a rare-earth doped silica optical fibre. The rare-earth may be erbium for example.

Conveniently the optical waveguide comprises an optical D-fibre which allows ready tapping out of the optical signal using evanescent optical coupling.

The optical pump means may include two optical sources in parallel each of sufficient optical power to adequately pump all the optical amplifiers. In this arrangement should one optical source fail the other can maintain the network whilst the first is being repaired. Alternatively two or more optical pump sources may be separately coupled to the waveguide at one end of the communications network.

The optical amplifiers may be any optically pumpable optical amplifiers able to access optical pump power distributed by the optical waveguide, for example semiconductor amplifiers, but the invention has particular application to optical waveguide amplifiers, that is optical waveguides doped with a dopant ion which provides amplification at the optical signal wavelength. The invention is applicable to a wide range of scales of size of optical communications networks. It is applicable to opto-electronic integrated circuits in which optical amplifiers and waveguides with couplers are formed as a micro-network in a semiconductor substrate, for example InP. On a larger scale the invention can be employed where doped $LiNbO_3$ waveguides form the optical amplifiers. In telecommunications networks varying from 10s of meters to 10s of kilometers, rare-earth doped fibre amplifiers which are readily spliced to the communications optical fibre may be used. Such rare earth doped fibre amplifiers are well known. See for example "Review of rare earth fibre lasers and amplifiers" By Paul Urquhart IEEE Proceedings Vol 135 Pt J No. Dec. 6, 1988.

In such networks, the optical amplifier may be positioned before a portion of the signal is extracted, afterwards to compensate for the portion extracted and between tapping points to compensate for absorption and other incidental, non-tapping losses.

Losses generally associated with known tapped optical distribution networks include the inherent losses due to impurities, Rayleigh scattering, and microbend losses, for example, as well as the splice losses which occur at the spliced joints between the optical waveguide, the optical amplifiers and the fused optical couplers when they are used as the tapping means.

The splicing losses at the junction of the optical waveguides and the optical amplifiers can be eliminated by providing that the optical waveguide itself is an optically pumpable optical amplifier having a total gain to provide the required degree of compensating amplification. That is, the waveguide constitutes the amplifier.

According to a further aspect of the present invention the entire optical waveguide comprises an optical waveguide amplifier including the propagation path through the tapping means. For example, where the optical waveguide is an optical fibre the tapping means may be a fused optical coupler formed from at least one optical fibre which is of the same composition as the optical waveguide. This fibre can be spliced to the optical waveguide with a smaller insertion loss than if only undoped communications fibre where used to form the coupler.

The tapping means may comprise a half coupler block evanescently coupling a portion of the optical signal from the optical waveguide. The waveguide will be formed with a coupling region in known manner. A particularly convenient arrangement is to form the optical waveguide from an optical fibre amplifier having a D-shaped cross-section. Evanescent coupling can then be readily obtained at positions perhaps not determined when the fibre was installed. In this arrangement there are no splicing losses along the optical waveguide.

BRIEF DESCRIPTION OF THE DRAWINGS

The invention will now be described by way of example only with reference to the accompanying drawings of which

DETAILED DESCRIPTION OF THE INVENTION

Figure 1:
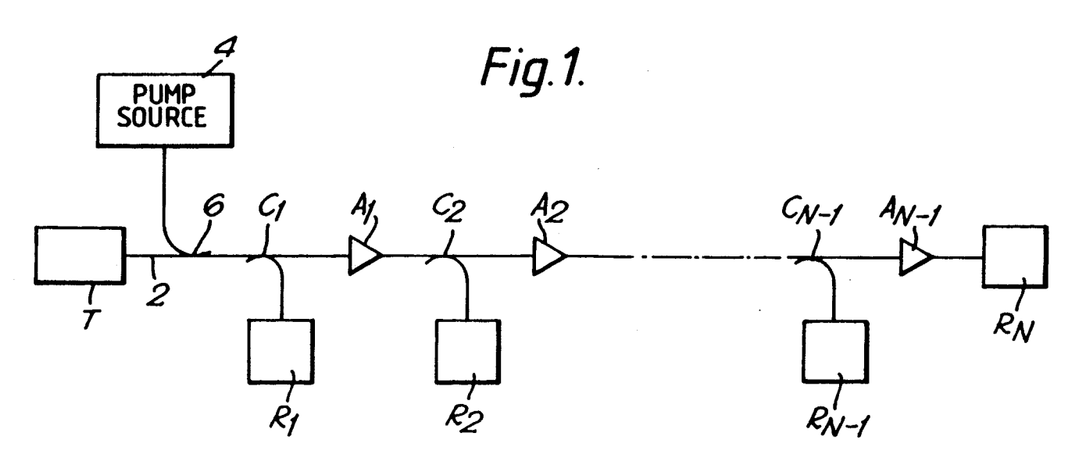
FIG. 1 is a schematic diagram of an embodiment of the present invention.

Referring to FIG. 1 a generalised optical network according to the present invention comprises an optical waveguide 2 to which are optically coupled a transmitting station T and receiving stations $R_1$ to $R_N$. The optical signals transmitted by the transmitting station T is passively split to each receiving station $R_1$ to $R_N$ by means of associated tapping means $C_1$ to $C_N$ comprising, for example, fused optical couplers in the case where the optical waveguide 2 is a communications optical fibre. Positioned after each tapping means $C_i$ is an optical amplifier $A_i$ which amplifies the optical signal to compensate for propagation, coupling losses and so on so that there is sufficient power in the optical signal exiting the optical amplifier $A_i$ to allow the receivers downstream of $R_i$ to receive a detectable optical signal.

In some cases there may be a single coupler positioned some distance from the transmitter station in which case two amplifiers may be employed, one to amplify the signal before it reaches the coupler to overcome general propagation losses together with a second optical amplifier positioned after the coupler to compensate for the coupled out portion of the optical signal.

An optical pump source 4 is coupled to the optical waveguide 2. This may be by means of a dichroic coupler 6 arranged such that substantially all the pump power and transmitted optical signal are passed to the first coupler $C_1$.

Each amplifier $A_i$ is pumped by the optical power from the pump source 4 it being arranged that there is sufficient remnant pump power exiting each amplifier $A_i$ to pump the remaining amplifiers $A_{i+1}$ to $A_{N-1}$.

The optical pump source 4 could equally well be coupled to the other end of the network between receiver $R_N$ and coupler $C_{N-1}$. Further transmitter stations could be coupled to the waveguide if required.

A larger network may be formed by concatenating two or more networks according to the present invention: that is, to form a network having two or more groups of amplifiers pumped by a respective pump source. There are then two or more pump sources associated with the overall network but the benefits of the invention accrue to the subnetworks of which it is formed.

Figure 2:
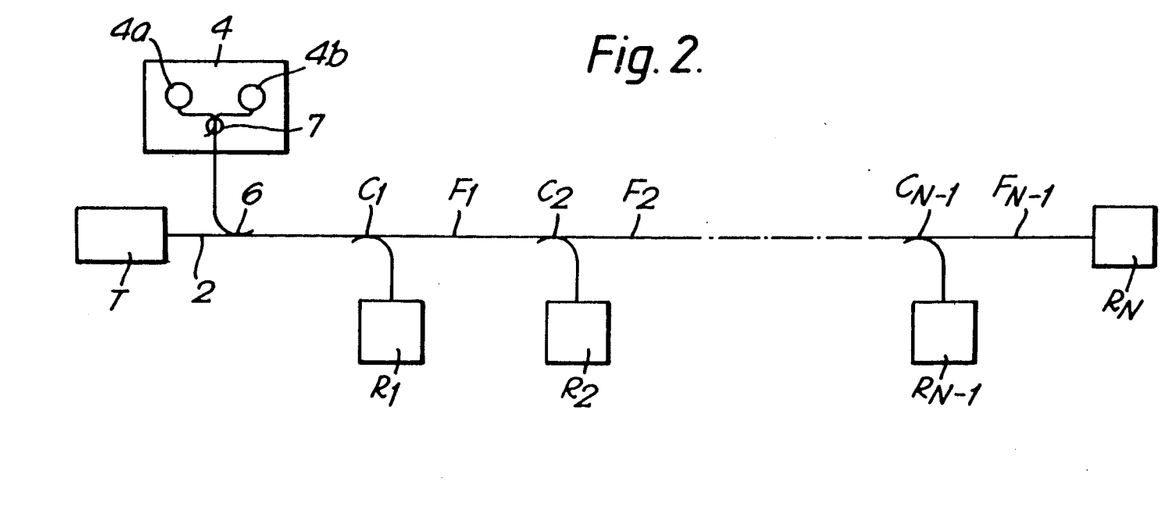
FIG. 2 is a schematic diagram of the arrangement of FIG. 1 in which the optical waveguide forms the optical amplifier.

Referring now to FIG. 2 there is shown an embodiment of the invention in which the optical waveguide is doped so that it itself forms the optically pumpable optical amplifiers necessary to compensate for coupling and propagation losses of the optical signals transmitted by the transmitting station T. The elements common to FIG. 1 is referenced by the same symbols. The optical waveguide portions $F_1$ to $F_{N-1}$ correspond to the amplifiers $A_1$ to $A_{N-1}$ of FIG. 1, all the fibre portions $F_1$ to $F_{N-1}$ being optically pumped by the pump source 4 which comprises two separate optical sources 4a and 4b in parallel coupled to the coupler 6 by means of the coupler 7.

The optical couplers $C_i$ are formed in known manner from optical fibres of the same composition as the fibre amplifier portions $F_i$. This reduces splice losses at the splices between the couplers $C_i$ and the fibre portions $F_i$.

It will be appreciated that the gain provided by the amplifiers need not exactly compensate for the coupled-out optical signal portions. In the FIG. 2 embodiment, for example, each fibre portion $F_i$ may provide equal gain per unit length but if two couplers are close enough together the fibre amplifier between them would have insufficient gain to compensate for the portion of the optical signal coupled out by the first of the couplers. However, the network would be designed such that later fibre portions give sufficient gain to allow downstream receivers to receive an adequate signal for detection.

Figure 3:
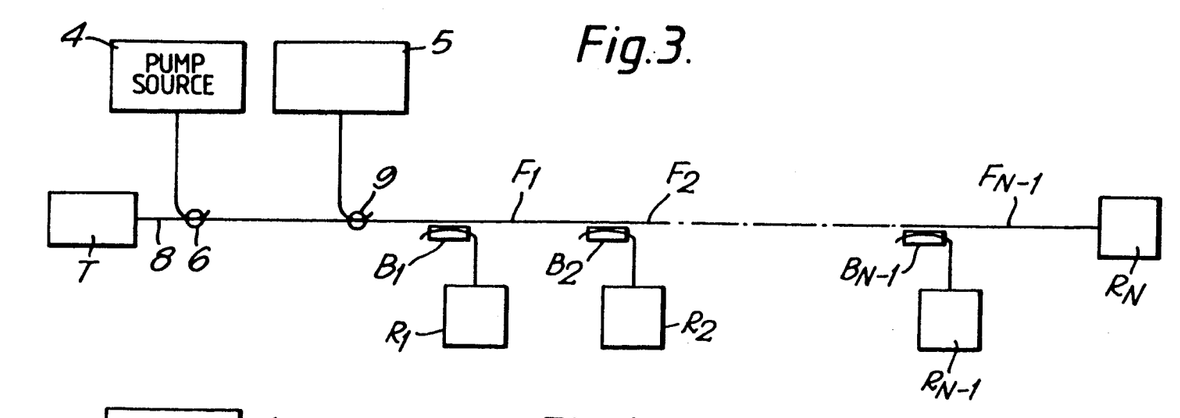
FIG. 3 is a schematic diagram of a further embodiment of the invention in which the optical waveguide is a D-fibre optical fibre amplifier.

Referring now to FIG. 3, an optical network similar to that of FIG. 2 (with like elements commonly referenced) has an erbium doped silica optical fibre of D-shaped cross-section ("D-fibre") 8 as the optical waveguide. Such a D-fibre is made by sawing a portion off the optical fibre preform before pulling in known manner. By using such an optical waveguide, optical tapping can be readily achieved by the use of evanescent coupling via half-coupler blocks $B_1$ to $B_N$ although other tapping means may be employed. With this embodiment there are none of splicing losses which may be introduced by splicing optical couplers into the propagation path.

In this embodiment the optical fibre waveguide forms a unitary fibre amplifier pumped by a pair of optical sources 4 and 5 coupled to the waveguide 8 by means of couplers 6 and 9, respectively. Should one of the optical sources 4 or 5 break down the remaining functioning one maintains the optical communications network. The two pump sources 4 and 5 are to be regarded as a single pump means coupled to the waveguide 8 at one end of the optical communications network of FIG. 3 providing optical pump power for all the amplifiers of the network $F_1$ $F_{N-1}$ thereby obviating the need for many optical pump sources distributed down the network.

The doped optical waveguides $F_i$ shown in FIG. 2 may comprise waveguides other than the optical fibre waveguides of FIG. 3. For example lithium niobate waveguides doped with erbium may be employed for applications where the receiver tapping means are in the order of centimeters apart.

The invention is applicable to topologies other than those illustrated in FIGS. 1 to 3 where a single transmitter station transmits optical signals to a series of receiving stations $R_1$ to $R_N$. Further examples will now be described.

Figure 4:
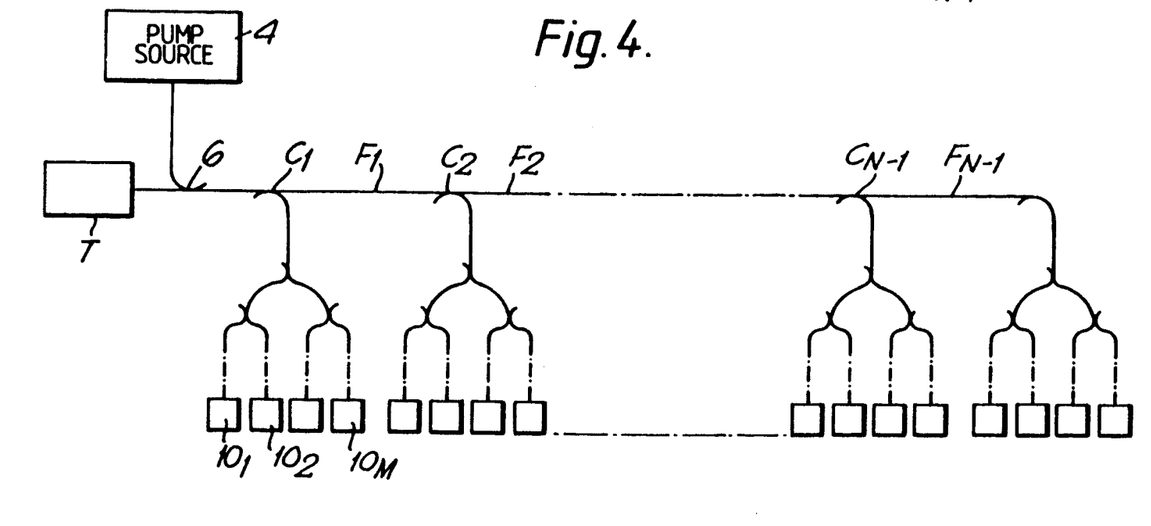
FIGS. 4-6 are schematic diagrams of further exemplary topologies of communications networks embodying the present invention.

Referring to FIG. 4, an optical network similar to that of FIG. 2 is shown in which each coupler $C_i$ taps off sufficient optical power to allow passive splitting to a group of M receivers $10_1$ to $10_M$. In this case the gain provided by the fibre portions $F_i$ will need to be greater than in the FIG. 2 embodiment to compensate for the greater power removed from the optical signal by the couplers $C_i$.

Figure 5:
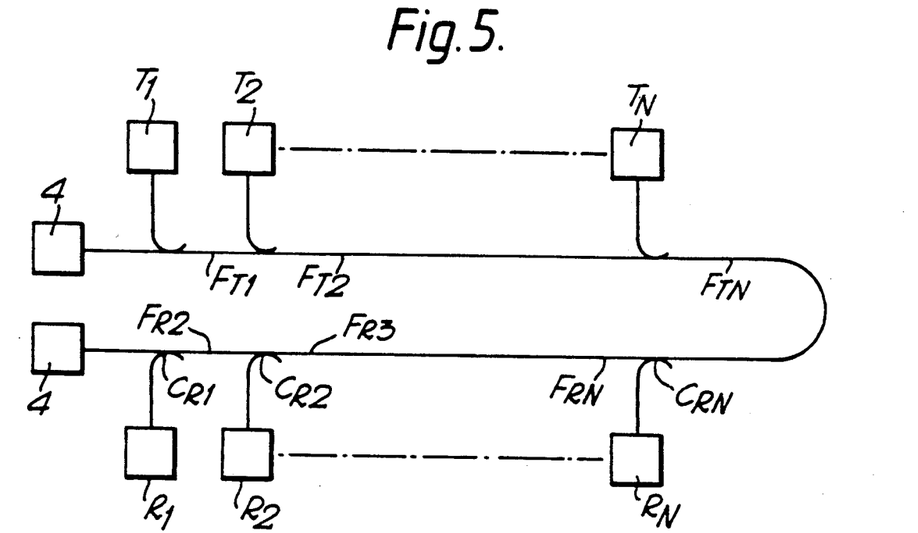

Referring to FIG. 5, there is shown an optical network having many transmitting stations T and receivers R. In this example fibre amplifiers $F_{T1}$ to $F_{TN}$ compensate for any propagation losses whereas fibre portions $F_{R2}$ to $F_{RN}$ serve to compensate also for losses due to coupling out of portions of the optical signal by the couplers $C_{R1}$ to $C_{RN}$. Two optical sources 4 are shown each providing pump power for a sub-network according to the present invention. In particular networks it may be sufficient to provide only one optical pump source to pump all the fibre portions $F_{R1}$ to $F_{TN}$ and $F_{R2}$ to $F_{RT}$.

Figure 6:
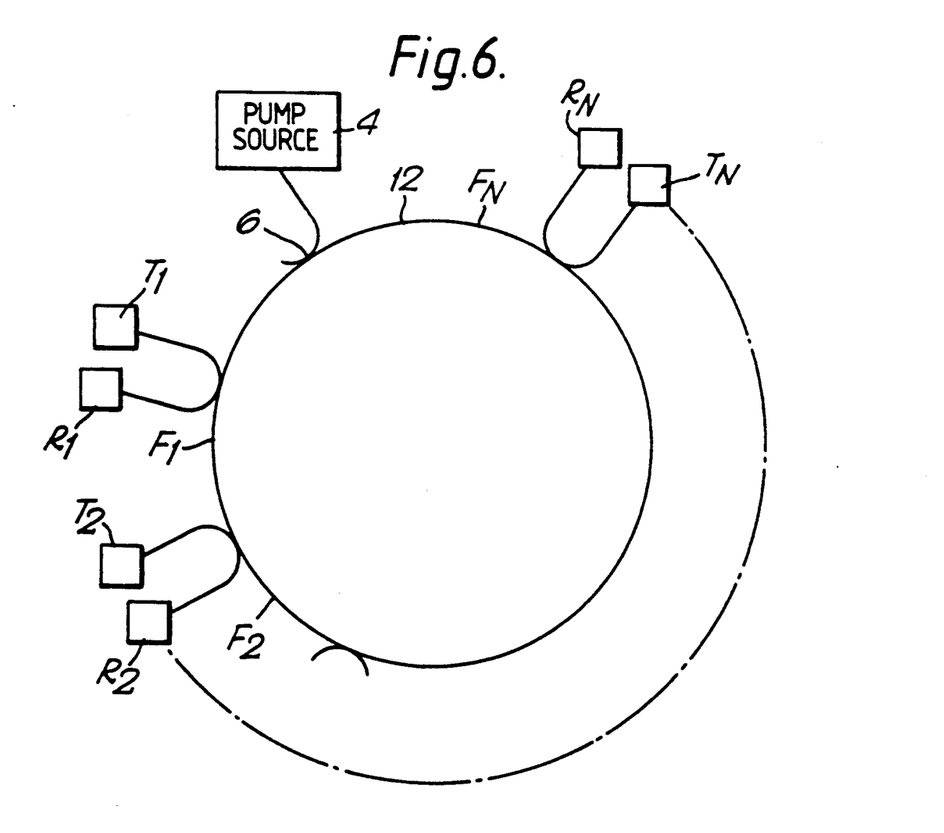

A yet further embodiment of the present invention is shown in FIG. 6 in which the optical waveguide is in the form of a ring 12 of an optical fibre amplifier pumped by the optical pump source 4 in the same manner as in the previously illustrated embodiments.

Considering again the FIG. 2 embodiment of the present invention and assuming it is designed to operate as a TDMA coherent network in which there are a) 8 channels;

b) the data rate is 155M bits/s per circuit;

c) giving a total through put of 1.24 GBit/s the waveguide 2 is a D-fibre Erbium doped silica optical fibre pumped at 980 nm with a 100 mW source;

d) the couplers $C_i$ are based on $LiNbO_3$ Mach-Zender device with an insertion loss of 7 dB;

f) the optical signal wavelength is 1.5 μm;

g) the coherent receiver sensitivity is −47 dBm at 1.24 GBit/s (approximately 7 dB from the shot noise limit D;

h) excess loss plus margin (including spontaneous noise penalty)=7 dB;

i) pump conversion efficiency of 0.1;

j) receiver coupling losses are 0.25 mW; and k) the minimum received power is $-40$ dBm $= 10^{-4}$ mW;

it is estimated that the network could have 8,800 taps of 2% of the optical signal.

Figure 7:
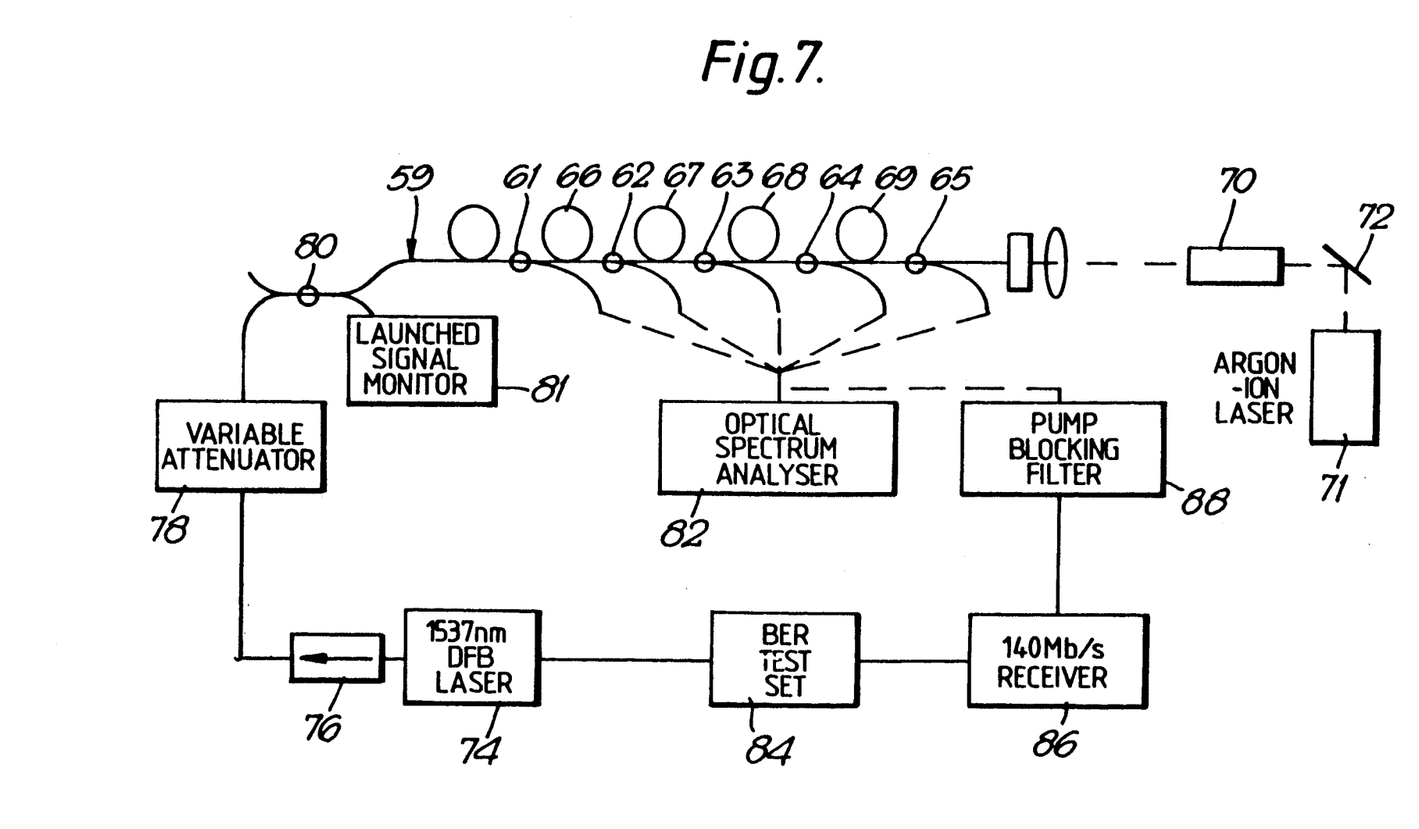
FIG. 7 is a schematic diagram of an experimental arrangement of the present invention.

If the receiver coupling losses were 0.01 mW then one could configure an optical communications network according to the present invention having 100 taps of nominal 0.2 tapping coefficient each capable of a 16-way passive optical split serving a total of 1600 receivers. If the bus tapping coefficient could be set to 0.1 with 5% accuracy the number of taps could be increased to 900 giving a capacity of over 14,000 receivers. Referring now to FIG. 7 a prototype distributed fibre amplifier according to the second aspect of the present invention bus network comprises five, 3 dB directional couplers 61, 62, 63, 64 and 65 coupled by 165 m lengths of lightly doped erbium fibre 66, 67, 68 and 69.

The fibre length between each tap was chosen such that when pumped to full inversion the signal gain was just sufficient to compensate for the 3 dB tap and excess loss due to splices and the non-ideal couplers. The network was contradirectionally pumped by a Ti Sapphire laser 70 operating at 978 nm pumped by an argon ion laser 71 via mirror 72. The fibre used was $GeO_2/SiO_2$ in composition and was lightly doped to a few ppm using the frit method. See S. P. Craig-Ryan, et al, "Fabrication of Long Lenghts of Low Excess Loss Erbium-Doped Optical Fibre", Electronics Letters, Vol 26, No. 3, 1990. The coupler characteristics were 50% at 1537 nm and 10% at 978 nm.

The evolution of signal power along the bus was investigated for various values of launched pump power and input signal powers. The input signals were generated by a 1537 nm DFB laser 74 and coupled, via an optical isolator 76 and a variable attenuator 78, to the bus by a four-port coupler 80. An optical power monitor 81 also coupled to coupler 80 was used to monitor the pump power from the laser 74. Measurements were made of the optical signals tapped from the bus 59 by couplers 61 to 65 using a calibrated optical spectrum analyser 82 thus enabling the spontaneous spectral density at the signal wavelength to be obtained.

Figure 8:
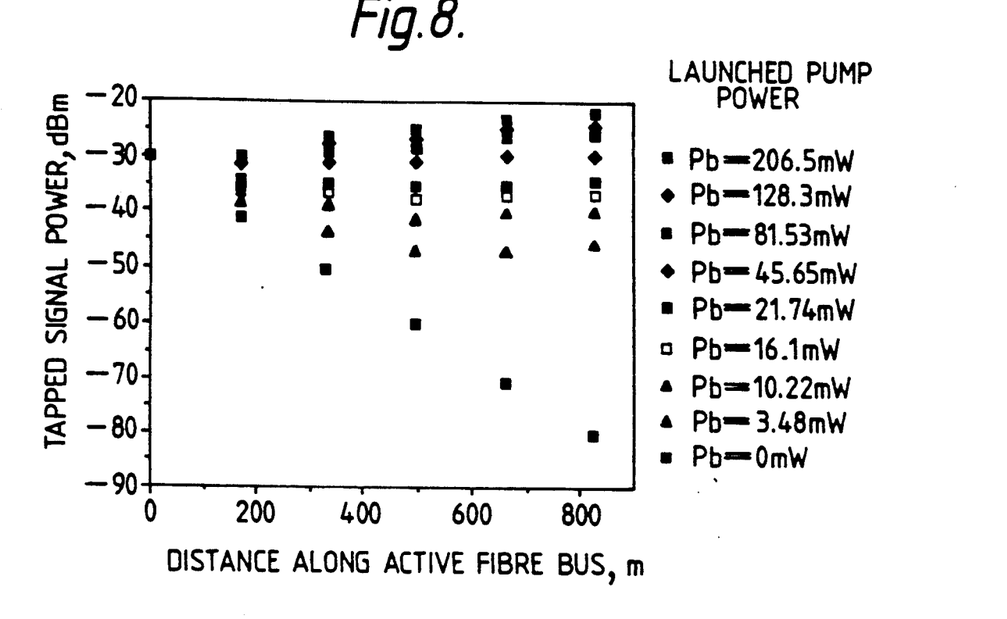
FIGS. 8 and 9 are graphs of the characteristics of the embodiment of FIG. 7 for small and large signals, respectively.
Figure 9:
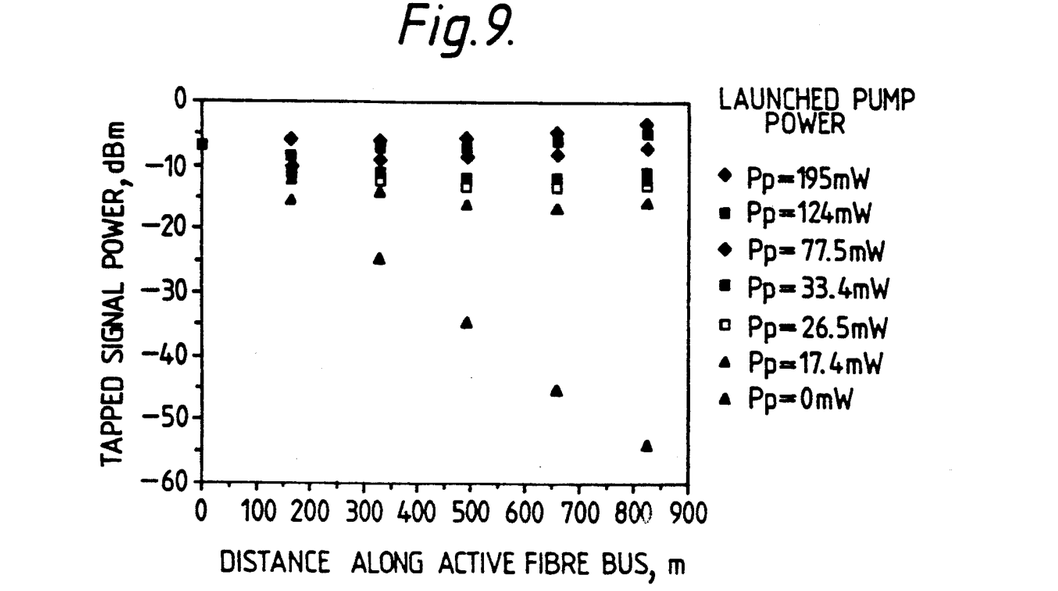

FIG. 8 indicates that for an input signal power of −30 dBm a balanced output of around −35 dBm can be obtained for a launched pump power of approximately 25 mW. With a larger input signal of −6.9 dBm. FIG. 9 indicates that nearer 40 mW is required to achieve a balanced output of −10 dBm. For higher values of launched pump power a distributed net gain is observed along the bus saturating as near full inversion is reached over the entire network. Quantitative analysis of the pump power requirements of the bus is complicated by the many unknown splice losses and excess losses within the couplers of the bus. However, the potential for active fibre bus networks to compensate for many power splits and distribute significant levels of optical power is clearly demonstrated. It is estimated that there was an average of 1.5 dB loss per tap at the pump wavelength. This implies that the pump propagation through the bus 59 is almost entirely dominated by excess splice and coupler losses, indicating that less than half of the total 25 mW pump power, required to produce a small signal balanced output, is actually being usefully absorbed in the doped fibre.

Figure 10:
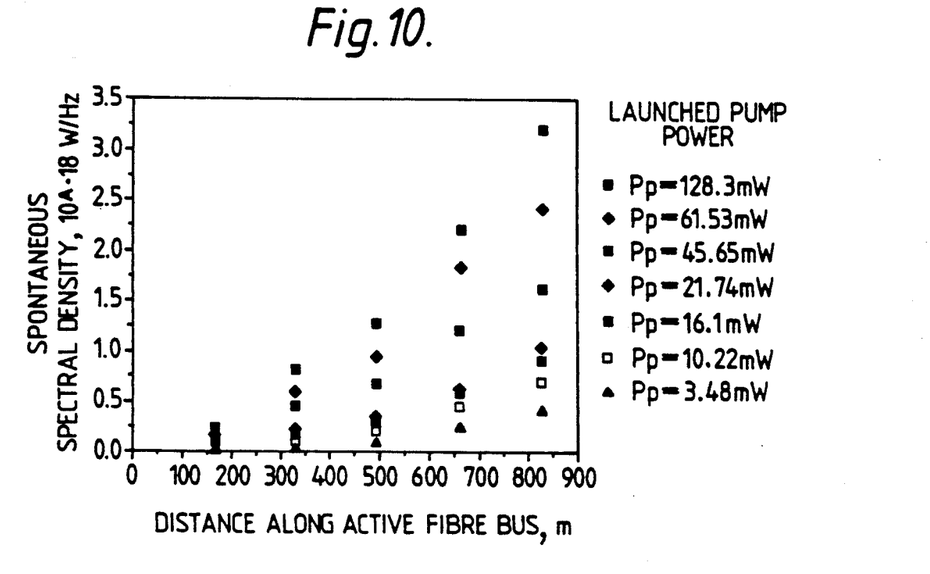
FIG. 10 is a graph showing the accumulation of spontaneous emission at $\lambda = 1537$ nm along the network of FIG. 7.
Figure 11:
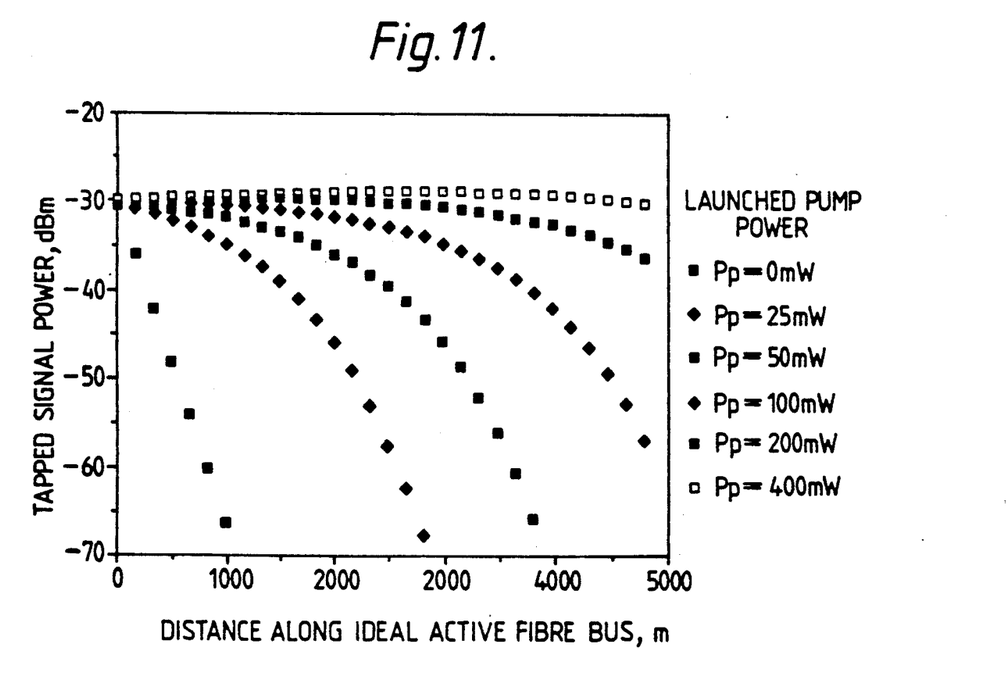
FIG. 11 is a graph showing the theoretical evolution of receiver degradation as a function of tap number for the embodiment of FIG. 7.

The accumulation of noise along the back-bone of the bus 59 will clearly be an important factor in the design of such architectures. FIG. 10 shows the accumulation of spontaneous spectral density along the bus 59 at a wavelength of 1537 nm. For a launched pump power of 25 mW the noise accumulation is approximately linear, as would be expected for a series of gain-loss elements in which the gain equals the loss.

In order to investigate the system performance of the active fibre bus 59, a 140 Mb/s system was operated over the network using a BER testset 84 and a 140 Mbits/s receiver 86. During these experiments it was necessary to place a pump filter 88 between the receiver 86 and the ports of the bus. Reflections at the couplers 61–65 and Raleigh backscatter are the most likely sources of this back reflected pump power. The filter arrangement 88 had a loss of approximately 2.5 dB at the signal wavelength, which influenced the system power budget. In an initial experiment the input signal power to the bus 59 was gradually reduced to $-30$ dBm which was the minimum signal power required to give an error rate of better than 1 in $10^9$ from each of the five signals coupled from of the bus 59. During this experiment the pump power was kept constant at around 30 mW in order to give a balanced output from the bus. With the input signal set to $-30$ dBm the lowest output from the bus 59 via coupler 63 was $-35.2$ dBm. When coupled with the 2.5 dB loss of the pump filter this value of minimum input signal level is consistent with a receiver sensitivity of around $-38$ dBm.

A further experiment was carried out in which the input level of the bus 59 was adjusted such that an error rate of 1 in $10^9$ was achieved for each of the tapped signals in turn. The received optical power required to achieve this error rate was measured for each coupler 61 to 65 indicating that within the $+/-0.5$ dB experimental error no receiver degradation could be attributed to the spontaneous emission from the bus 59. This observation is consistent with theoretical estimates of amplifier induced receiver degradation based on the measured levels of amplified spontaneous emission (ASE) shown in FIG. 10. We can conclude from these observations that in this 140 Mb/s system, or any higher bit rate IM/DD system, the performance will be limited by the receiver thermal noise and not the ASE from the amplifying bus.

In terms of the ultimate limits to the growth of such networks there are two parameters which require consideration. The first is the relationship between pump power and the possible number of tapping points. In the bus network of FIG. 7 it was demonstrated that the pump propagation is almost entirely dominated by the 1.5 dB excess loss present at each of the tapping points. In order to assess the likely ultimate size of this type of network a theoretical rate equation model similar to that of Desurvire, "Gain Saturation Effects in High Speed, Multichannel Erbium-Doped Fibre Amplifiers at $\lambda=1.53$ $\mu$m" Journal of Lightwave Technology, Vol.7.No.12 December 1989, has been extended to include the effects of periodic tapping. The effects of intrinsic pump attenuation due to the $SiO_2$ fibre are included as a 1 dB/km background loss. Using this model we have investigated the likely pump power requirements of an optical bus similar to that demonstrated in this work. In the model we assume a 3 dB tap at the signal wavelength and excess loss of 0.1%, per tap, at both pump and signal wavelengths. As can be seem from FIG. 10, a launched pump power of 200 mW would be sufficient to achieve virtual transparency over a 30 port network. Note that a network of this size is effectively providing a 90 dB split, giving $-30$ dBm at each port of the bus. Notice also that the physical size of this network, nearly 5 km long, is such that it could find many applications in local area network distribution systems.

Given that it seems likely that pump power will not be preclusive to the demonstration of networks of such a size, it is necessary to assess the other most likely limiting factor which is the accumulation of amplified spontaneous emission along the back-bone of the bus 59. Given the simplifying assumption of near complete, and therefore length independent, inversion over the entire network, it is a simple matter to show that the accumulation of spontaneous spectral density ($\rho$sp W/Hz) along the spine of a 3 dB gain-3 dB loss bus in linear, and is governed by $\rho sp(n)=n(hc/\lambda)\mu$; where $\mu$ is the inversion parameter of each amplifying section of fibre and n represents the nth tap along the bus. If one assumes a rectangular ASE spectrum which is length invariant, and a value of $\mu=1.25$ (i.e. F=4 dB), then it is possible to calculate the effect which ASE associated noise terms would have on receiver sensitivity as the ASE progressively accumulates along the doped fibre bus. Using the analysis of T. J. Whitley et al.; "An Erbium Doped Fibre Repeater/Preamplifier in a 100 km Intensity Modulated Direct Detection 2.5 Gb/s system", IEE Colloquium on Optical Amplifiers for Communications, Savoy Place, London, October 1989, we have calculated the expected degradation in receiver sensitivity which would be caused by the accumulation of ASE along an ideal bus consisting of 3 dB gain sections and 3 dB taps. Calculations were carried out assuming rectangular ASE spectra of both 2 nm and 0.5 nm, though in practice the actual bandwidth will be governed by the degree of gain narrowing which the ASE undergoes.

Figure 12:
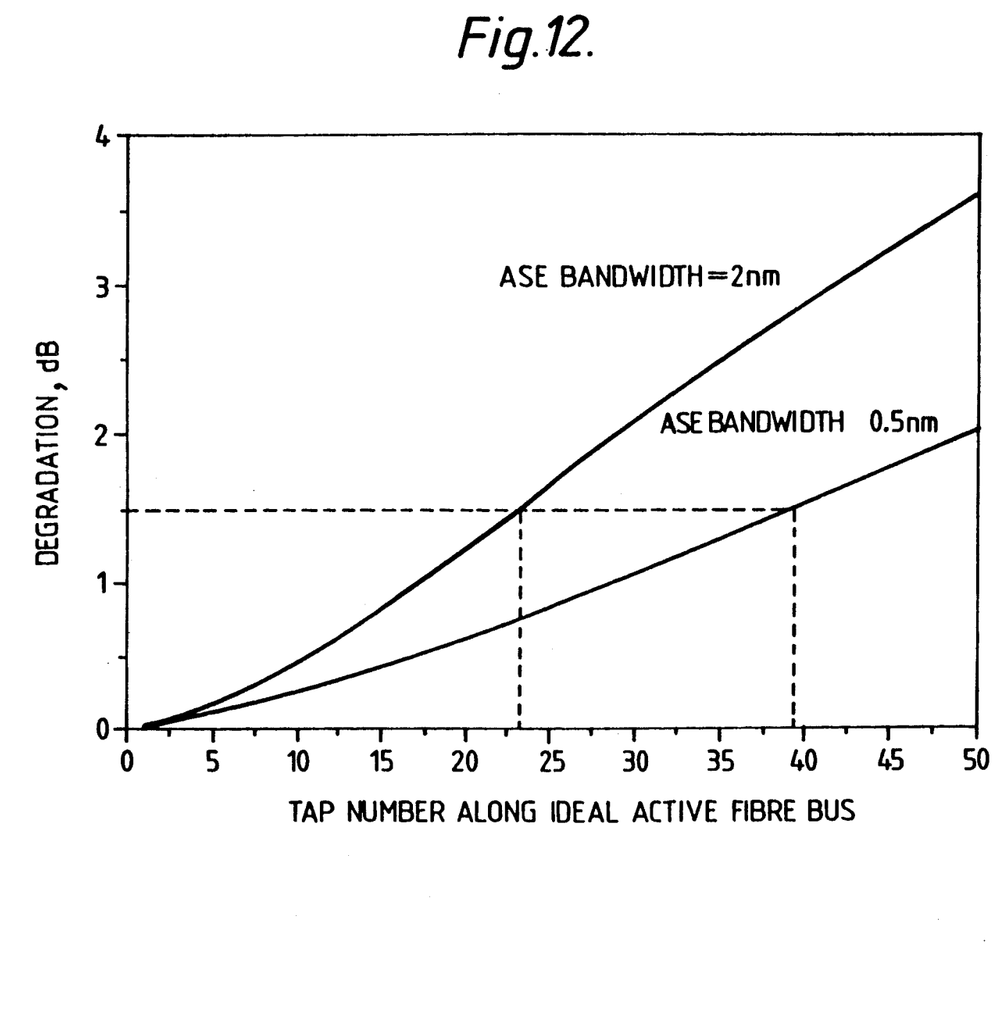
FIG. 12 is a graph of the theoretical evolution of signal power along an idealised version of the embodiment of FIG. 7.

An can be seen from FIG. 12, even in the rather pessimistic case in which an ASE bandwidth of 2 nm is assumed a network of around 23 taps, operating at 140 Mb/s, could be achieved with only 1.5 dB of ASE induced receiver degradation being incurred. With an ASE bandwidth of 0.5 nm, calculations indicate that a network of nearer 40 taps would be possible before any significant noise penalty was incurred. Moving to a higher bit rate than the 140 Mb/s used in this work would be likely to reduce this expected penalty because of the increased receiver thermal noise spectral density which is present at higher system rates.

Optical distribution networks based on lightly doped erbium fibre amplifiers will enable high-capacity, multi-tap optical busses to be realised. It is clear from the above analysis that the pump power requirements and noise accumulation in such networks will not preclude the demonstration of useful optical distribution systems. It is likely that the use of smaller tapping coefficients would enable many hundreds of taps, thus opening up many potential application areas from physically small inter-rack distribution systems, to large scale local loop applications, many km's in length.

I claim:

1. An optical communications network comprising an optical waveguide (2) for distributing optical signals, an optical tapping means ($C_2$); and a pair of optically pumpable optical amplifying means ($F_1, F_2$), the optical tapping means being located between the pair of amplifying means ($F_1, F_2$), characterised in that the pair of amplifying means ($F_1, F_2$) are optically pumped by one optical pump means (4), only, coupled to a single point of the waveguide (2).

2. An optical communications network comprising an optical waveguide (2) for distributing optical signals; a plurality of optical tapping means ($C_1$ to $C_{N-1}$); and a plurality of optically pumpable optical amplifying means ($F_1$ to $F_{N-1}$) located between at least some of the optical tapping means characterised in that all the optical amplifying means ($F_1$ to $F_{N-1}$) are optically pumped by one optical pump means (4), only, coupled to a single point of the waveguide (2).

3. A network as claimed in either of claims 1 or 2 in which the optical amplifying means ($F_1$ to $F_{N-1}$) comprise at least portions of the optical waveguide (2) doped with material to form an optical waveguide amplifier.

4. A network as claimed in claim 3 in which the optical amplifying means ($F_1$ to $F_{N-1}$) comprise rare-earth doped optical waveguide amplifiers.

5. A network as claimed in claim 4 in which the rare-earth is erbium.

6. A network as claimed in claim 1 in which the optical waveguide (2) is a silica based optical fibre.

7. A network as claimed in claim 6 in which the optical tapping means ($C_1$ to $C_{N-1}$) comprise fused optical fibre couplers ($C_1$ to $C_{N-1}$).

8. A network as claimed in claim 1 in which at least a portion of the optical waveguide (2) comprises optical D-fibres.

9. A network as claimed in claim 1 in which the optical tapping means ($C_1$ to $C_{N-1}$) comprises evanescent couplers ($C_1$ to $C_{N-1}$).

10. A network according to claim 1 in which the entire optical waveguide (2) connecting the coupling means ($C_1$ to $C_{N-1}$) is doped with a material to form an optical waveguide amplifier.

11. A network according to claim 1 in which the optical pump means (4) comprises a pair of optical sources ($4a, 4b$) coupled in parallel.

12. An optical network as claimed in claim 1 in which the optical waveguide (12) forms a ring.

* * * * *